(12) United States Patent
Perez (10) Patent No.: US 11,498,513 B2
(45) Date of Patent: Nov. 15, 2022

(54) AIRBAG WITH PASSIVE AND ACTIVE VENTS

(71) Applicant: ZF Passive Safety Systems US Inc., Washington, MI (US)

(72) Inventor: Jaime Perez, Lake Orion, MI (US)

(73) Assignee: ZF PASSIVE SAFETY SYSTEMS US INC., Washington, MI (US)

(*) Notice: Subject to any disclaimer, the term of this patent is extended or adjusted under 35 U.S.C. 154(b) by 0 days.

(21) Appl. No.: 17/213,310

(22) Filed: Mar. 26, 2021

(65) Prior Publication Data
US 2022/0306038 A1 Sep. 29, 2022

(51) Int. Cl.
*B60R 21/239* (2006.01)
*B60R 21/2338* (2011.01)
(Continued)

(52) U.S. Cl.
CPC ........ *B60R 21/239* (2013.01); *B60R 21/2338* (2013.01); *B60R 21/233* (2013.01); *B60R 2021/0009* (2013.01); *B60R 2021/0023* (2013.01); *B60R 2021/2395* (2013.01); *B60R 2021/23382* (2013.01)

(58) Field of Classification Search
CPC . B60R 21/205; B60R 21/233; B60R 21/2338; B60R 21/239; B60R 2021/0009; B60R 2021/0023; B60R 2021/23161; B60R 2021/23308; B60R 2021/23324; B60R 2021/23382; B60R 2021/23384; B60R 2021/2395
See application file for complete search history.

(56) References Cited

U.S. PATENT DOCUMENTS

| 5,586,782 A | * | 12/1996 | Zimmerman, II | .... B60R 21/233 |
| | | | | 280/730.2 |
| 5,853,191 A | * | 12/1998 | Lachat | .............. B60R 21/23138 |
| | | | | 280/730.2 |

(Continued)

*Primary Examiner* — Laura Freedman
(74) *Attorney, Agent, or Firm* — Tarolli, Sundheim, Covell & Tummino LLP (57) ABSTRACT

An apparatus for helping to protect a vehicle occupant includes an airbag having primary and secondary chambers fluidly connected by a first passive vent and an active vent having an open condition and a closed condition. The primary chamber has a stored condition and a deployed condition to cover a portion of the vehicle. An interior panel divides the primary chamber into upper and lower inflatable volumes and includes a second passive vent fluidly connecting the upper and lower inflatable volumes. The secondary chamber has a stored condition and a deployed condition to cover portions of the vehicle left uncovered by the primary chamber. An inflator is actuatable to provide inflation fluid to the primary chamber. The active vent is controllable to prevent fluid communication between the primary and secondary chambers in response to occupant penetration into the primary chamber and controllable to allow fluid communication between the primary and secondary chambers in response to occupant penetration into the secondary chamber. The second passive vent automatically closes to prevent fluid flow from the lower inflatable volume to the upper inflatable volume in response to occupant penetration into the secondary chamber.

20 Claims, 8 Drawing Sheets

(51) Int. Cl.
*B60R 21/233* (2006.01)
*B60R 21/00* (2006.01)

(56) References Cited

U.S. PATENT DOCUMENTS

| | | | |
|---|---|---|---|
| 9,150,186 B1* | 10/2015 | Belwafa | B60R 21/205 |
| 9,205,798 B1* | 12/2015 | Jindal | B60R 21/231 |
| 9,272,684 B1* | 3/2016 | Keyser | B60R 21/237 |
| 9,333,938 B2* | 5/2016 | Guerrero | B60R 21/233 |
| 9,340,176 B2* | 5/2016 | Belwafa | B60R 21/205 |
| 9,376,084 B2* | 6/2016 | Choi | B60R 21/233 |
| 9,428,140 B2* | 8/2016 | Lee | B60R 21/239 |
| 9,440,612 B2* | 9/2016 | Anderson | B60R 21/2338 |
| 9,499,118 B2* | 11/2016 | Jindal | B60R 21/01512 |
| 9,533,652 B1* | 1/2017 | Paxton | B60R 21/239 |
| 9,550,465 B1* | 1/2017 | El-Jawahri | B60R 21/0134 |
| 9,555,762 B2* | 1/2017 | Umehara | B60R 21/233 |
| 9,561,774 B2* | 2/2017 | Cheng | B60R 21/239 |
| 9,580,039 B2* | 2/2017 | Schneider | B60R 21/233 |
| 9,650,011 B1* | 5/2017 | Belwafa | B60R 21/233 |
| 9,663,059 B2* | 5/2017 | Anderson | B60R 21/239 |
| 9,845,067 B2* | 12/2017 | Morris | B60R 21/233 |
| 9,862,350 B2 | 1/2018 | Guerrero et al. | |
| 10,011,243 B2* | 7/2018 | Patel | B60R 21/01552 |
| 10,059,299 B2* | 8/2018 | Yamada | B60R 21/233 |
| 10,246,042 B2* | 4/2019 | Sumiya | B60R 21/203 |
| 10,293,777 B2* | 5/2019 | Paxton | B60R 21/239 |
| 10,464,519 B2* | 11/2019 | Kim | B60R 21/231 |
| 10,611,331 B2* | 4/2020 | Jang | B60R 21/2338 |
| 10,632,959 B2* | 4/2020 | Jeong | B60R 21/26 |
| 10,730,472 B2 | 8/2020 | Perez | |
| 10,773,679 B2* | 9/2020 | Jeong | B60R 21/2338 |
| 10,787,146 B2* | 9/2020 | Jang | B60R 21/237 |
| 10,814,821 B2* | 10/2020 | Park | B60R 21/233 |
| 2019/0039557 A1* | 2/2019 | Barnes | B60R 21/205 |

\* cited by examiner

AIRBAG WITH PASSIVE AND ACTIVE VENTS

FIELD OF THE INVENTION

The present invention relates to an apparatus for helping to protect an occupant of a vehicle and, in particular, relates to an airbag inflatable between an instrument panel and a front seat of a vehicle.

BACKGROUND

It is known to provide an inflatable vehicle occupant protection device, such as an airbag, for helping to protect an occupant of a vehicle. Airbags are deployable in response to the occurrence of an event for which occupant protection is desired, such as an impact to the vehicle, a vehicle collision, a vehicle rollover, or a combination thereof. Frontal collisions refer to collision events in which a vehicle experiences an impact at the front of the vehicle. These frontal collisions cause front seat vehicle occupants to move forward in the vehicle toward structures, such as the steering wheel (driver side occupant) and/or the instrument panel (passenger side occupant).

Frontal collisions of a vehicle can occur as a result of the vehicle travelling forward into an object, such as another vehicle, a tree, a pole, etc. Frontal collisions can also occur as a result of a stationary vehicle being impacted at the front by another vehicle. Frontal collisions can further occur as a result of two or more moving vehicles moving toward each other in a "head on" impact.

To help protect occupants of vehicles involved in frontal collisions, the vehicle can be equipped with frontal airbags. On the passenger side of the vehicle, airbags are typically deployed from a housing located within the instrument panel of the vehicle. Because the occupant on the passenger side is not charged with operating the vehicle, the passenger driver frontal airbag can be configured to cover a large area in front of the front passenger seat, i.e., the instrument panel, windshield, etc., and can extend laterally, in both outboard and inboard directions in the vehicle, for example, from adjacent or near the passenger door to adjacent or near the centerline of the instrument panel or even beyond.

The inflatable volume of airbags increases with the coverage that the airbag provides. Passenger airbags also typically have a substantial depth, so as to optimize the cushioning effect it has on an impacting occupant. Airbags need to reach the inflated and deployed condition within a predetermined amount of time, which is a fraction of a second. To do this, the inflator is sized to deliver inflation fluid at a volumetric flow rate that will result in deployment of the airbag within the required time. All of these factors must be considered and balanced when configuring an airbag system. There are limitations on inflator size (the volume of inflation fluid delivered by the inflator and the rate at which it is delivered) and, because of this, the configuration of the airbag (coverage, depth, volume, etc.) has to be matched and balanced accordingly. As a result, it can be desirable to optimize the passenger airbag in terms of coverage and depth, given the capabilities of the inflator.

On the driver side of the vehicle, driver frontal airbags are typically deployed from a housing located within the steering wheel. Because the occupant on the driver side is charged with operating the vehicle, the driver frontal airbag has to be configured with this in mind. For example, the operator may not be steering the vehicle in a straight forward direction at the time of the collision and, therefore, the steering wheel can be rotated when the airbag deploys. Because of this, steering wheel mounted airbags typically have a round/circular cushion configuration that coincides with the position and attitude of the steering wheel. Additionally, the driver frontal airbag must be configured taking into account that the operator of the vehicle will likely have one or both hands on the steering wheel at the time a collision takes place. Because of this, the steering wheel mounted airbag can be configured to have a diameter that is selected to provide adequate frontal impact protection while avoiding airbag deployment into contact with the operator's hands and arms.

One particular type of collision for which an airbag may be deployed can be referred to as an oblique collision. Oblique collisions are considered generally to be any non-frontal, i.e., any non-zero degree angle, vehicle collision. In its simplest form, a frontal, zero degree angle vehicle collision would involve a vehicle impacting, for example, a flat brick wall when the vehicle is travelling at a straight forward direction perpendicular to that wall. As a result of this impact, the occupant would move forward in a direction parallel to the vehicle axis and the direction of forward vehicle travel into contact with the deployed airbag. From this, it follows that an oblique collision, i.e., a non-frontal or non-zero angle collision, would be any collision scenario that results in the occupant moving relative to the central vehicle axis and direction of forward vehicle travel in a direction that is not parallel to the axis of straight forward vehicle travel.

Oblique collisions can occur in a variety of scenarios. For example, a vehicle travelling in a straight forward direction colliding with an angled surface, such as another vehicle oriented in a non-parallel manner, would be considered an oblique collision. As another example, an offset collision in which a vehicle collides with an object, such as another vehicle, that is offset laterally would be considered an oblique collision. This would be the case, for instance, in a vehicle collision in which the front passenger side bumper strikes the rear driver side bumper of another vehicle. As a further example, vehicles colliding when travelling in directions that are not parallel, i.e., at an angle, would be considered an oblique collision.

Additionally, in oblique collision scenarios causing forward-inboard movement of a seatbelt restrained occupant, whether a driver seat occupant or a passenger seat occupant, the movement of the occupant is in a direction that escapes the shoulder belt portion of the seatbelt. By "escapes," it is meant to refer to the fact that the shoulder belt restraint extends downward and inward from the outboard shoulder across the torso and around the inboard hip. This being the case, forward-inboard occupant movement can cause the occupant's torso to slip out from behind the shoulder belt, thereby becoming partially unbelted or unrestrained.

Oblique collisions produce occupant movements in the vehicle that are also oblique, that is, the occupant moves obliquely relative to a central axis of the frontal airbag, i.e., an axis that extends through a longitudinal centerline of the airbag, which extends parallel to the longitudinal axis of the vehicle. This oblique movement can be forward-outboard (i.e., toward the door) or forward-inboard (i.e., toward the vehicle centerline). Forward-outboard movement of an occupant in response to an oblique collision can be handled through the deployment of known side or lateral airbag structures, such as side curtains, door mounted side airbags, seat mounted side airbags, pillar mounted side airbags, etc. Conventional airbag structures do not, however, cover for forward-inboard movement of the occupant. Additionally, forward-inbound moving occupants can escape the shoulder belt portion of the seatbelt, which presents further challenges.

Furthermore, prior to "escaping" in response to forward-inbound movement, the seatbelt can act on the occupant and apply restraining forces that alter the occupant's movement. For example, the seatbelt can engage the occupant's outboard shoulder and, in response to the forward-inboard occupant movement, can cause the occupant to rotate toward the outboard side of the vehicle as he or she escapes the belt. As a result, the occupant can also be subjected to rotational forces that produce rotational occupant movements during an oblique vehicle collision.

Moreover, because the passenger airbag necessarily occupies a comparatively large volume, it can be challenging to provide the desired area of coverage within the necessary airbag deployment time. Since the passenger airbag is typically deployed centrally from the instrument panel, i.e., directly in front of the passenger side occupant, it can be difficult to configure the airbag to also expand laterally to provide adequate coverage for the passenger side occupant in the case of an oblique collision, while at the same time meeting deployment time requirements.

SUMMARY

In one example, an apparatus for helping to protect an occupant of a vehicle includes an airbag having a primary chamber and a secondary chamber fluidly connected thereto by a first passive vent and an active vent having an open condition and a closed condition. The primary chamber has a stored condition and a deployed condition to cover a portion of the vehicle. An interior panel divides the primary chamber into upper and lower inflatable volumes and includes a second passive vent fluidly connecting the upper and lower inflatable volumes. The secondary chamber has a stored condition and a deployed condition to cover portions of the vehicle left uncovered by the primary chamber. An inflator is actuatable to provide inflation fluid to the primary chamber. The active vent is controllable to prevent fluid communication between the primary and secondary chambers in response to occupant penetration into the primary chamber and controllable to allow fluid communication between the primary and secondary chambers in response to occupant penetration into the secondary chamber. The second passive vent automatically closes to prevent fluid flow from the lower inflatable volume to the upper inflatable volume in response to occupant penetration into the secondary chamber.

In another example, an apparatus for helping to protect a vehicle occupant includes an airbag having primary and secondary chambers fluidly connected by first passive vents and an active vent having an open condition and a closed condition. Both of the primary and secondary chambers are free from any vents for venting inflation fluid external to the airbag. The primary chamber has a stored condition and a deployed condition to cover a portion of the vehicle. An interior panel divides the primary chamber into upper and lower inflatable volumes and includes a second passive vent having an opening fluidly connecting the upper and lower inflatable volumes. The secondary chamber has a stored condition and a deployed condition to cover portions of the vehicle left uncovered by the primary chamber. An inflator is actuatable to provide inflation fluid to the primary chamber. The active vent is actuable to the closed condition to prevent fluid communication between the primary and secondary chambers in response to occupant penetration into the primary chamber and un-actuated to remain in the open condition to allow fluid communication between the primary and secondary chambers in response to occupant penetration into the secondary chamber. The second passive vent automatically closes to prevent fluid flow from the lower inflatable volume to the upper inflatable volume in response to occupant penetration into the secondary chamber.

According to another aspect, taken alone or in combination with any other aspect, a flow rate of the inflation fluid flowing from the primary chamber into the secondary chamber when the active vent is actuated is greater than a flow rate of the inflation fluid flowing from the primary chamber to the secondary chamber when the active vent is not actuated.

According to another aspect, taken alone or in combination with any other aspect, the apparatus further comprises a controller configured to actuate the inflator and the actuatable vent in response to sensed conditions. The controller is configured to actuate the inflator in response to detecting the occurrence of an event for which inflation of the airbag is desired. The controller is configured to selectively actuate the active vent in response to detecting the occurrence of an event for which a more rapid inflation of the secondary chamber is desired.

According to another aspect, taken alone or in combination with any other aspect, the event for which a more rapid inflation of the secondary chamber is desired comprises at least one of an offset collision and an oblique collision.

According to another aspect, taken alone or in combination with any other aspect, the apparatus further comprises a tether via which the active vent can be maintained in a closed condition acts on the active vent. A release device is selectively releasably connected to the tether. The release device is in electric communication with the controller. The controller is configured to selectively actuate the release device in response to detecting the occurrence of an event for which a more rapid inflation of the secondary chamber is desired. The actuation of the release device releases the connection between the release device and the tether so that the active vent is moved to an opened condition.

According to another aspect, taken alone or in combination with any other aspect, the occurrence of an event for which a more rapid inflation of the secondary chamber is desired comprises at least one of an offset collision and an oblique collision. If the collision event is at least one of an offset collision and an oblique collision, the controller actuates the release device to release the connection between the release device and the tether. The release of the connection between the release device and the tether moves the active vent to the opened condition so that the active vent and the at least one passive vent directs inflation fluid from the primary chamber to the secondary chamber. If the collision event is not at least one of an offset collision and an oblique collision, the controller does not actuate the release device so that the connection between the release device and the tether is maintained. The maintenance of the connection between the release device and the tether holds the active vent in the closed condition so that the at least one passive vent directs inflation fluid from the primary chamber to the secondary chamber.

According to another aspect, taken alone or in combination with any other aspect, the inflator is a dual-stage inflator having first and second combustion chambers. Each of the first and second combustion chambers has at least one exhaust port. The exhaust ports of the first and second combustion chambers are configured to provide inflation fluid to the primary chamber.

According to another aspect, taken alone or in combination with any other aspect, the primary chamber, when inflated, is disposed directly forward of a vehicle seat in which the occupant is seated, and the secondary chamber, when inflated, is laterally inboard of the primary chamber.

According to another aspect, taken alone or in combination with any other aspect, the airbag is inflatable between an instrument panel of the vehicle and a passenger-side vehicle seat. The primary chamber, when inflated and deployed, covers a portion of the instrument panel that is presented in front of the passenger-side vehicle seat and spans at least substantially across the width of the passenger-side vehicle seat.

According to another aspect, taken alone or in combination with any other aspect, when the secondary chamber is inflated and deployed, the secondary chamber covers a portion of the instrument panel positioned laterally inboard of the primary chamber.

According to another aspect, taken alone or in combination with any other aspect, when the secondary chamber is inflated and deployed, the secondary chamber covers a portion of the instrument panel positioned laterally inboard of the passenger-side vehicle seat.

According to another aspect, taken alone or in combination with any other aspect, when the secondary chamber is inflated and deployed, the secondary chamber is configured to receive an occupant moving in an oblique direction in the vehicle.

According to another aspect, taken alone or in combination with any other aspect, the active vent is actuatable to place the active vent in the closed condition to prevent fluid communication between the primary and secondary chambers in response to occupant penetration into the primary chamber.

According to another aspect, taken alone or in combination with any other aspect, the active vent is maintained in the closed condition to prevent fluid communication between the primary and secondary chambers in response to occupant penetration into the primary chamber.

According to another aspect, taken alone or in combination with any other aspect, both of the primary and secondary chambers are free from any vents for venting inflation fluid external to the airbag.

According to another aspect, taken alone or in combination with any other aspect, an airbag module includes the apparatus.

According to another aspect, taken alone or in combination with any other aspect, a vehicle safety system includes the airbag module.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION

The present invention relates to an apparatus for helping to protect an occupant of a vehicle and, in particular, relates to an airbag inflatable between an instrument panel and a front seat of a vehicle. FIGS. 1-6 illustrate an example vehicle safety system in the form of an occupant restraint system 10.

Figure 1:
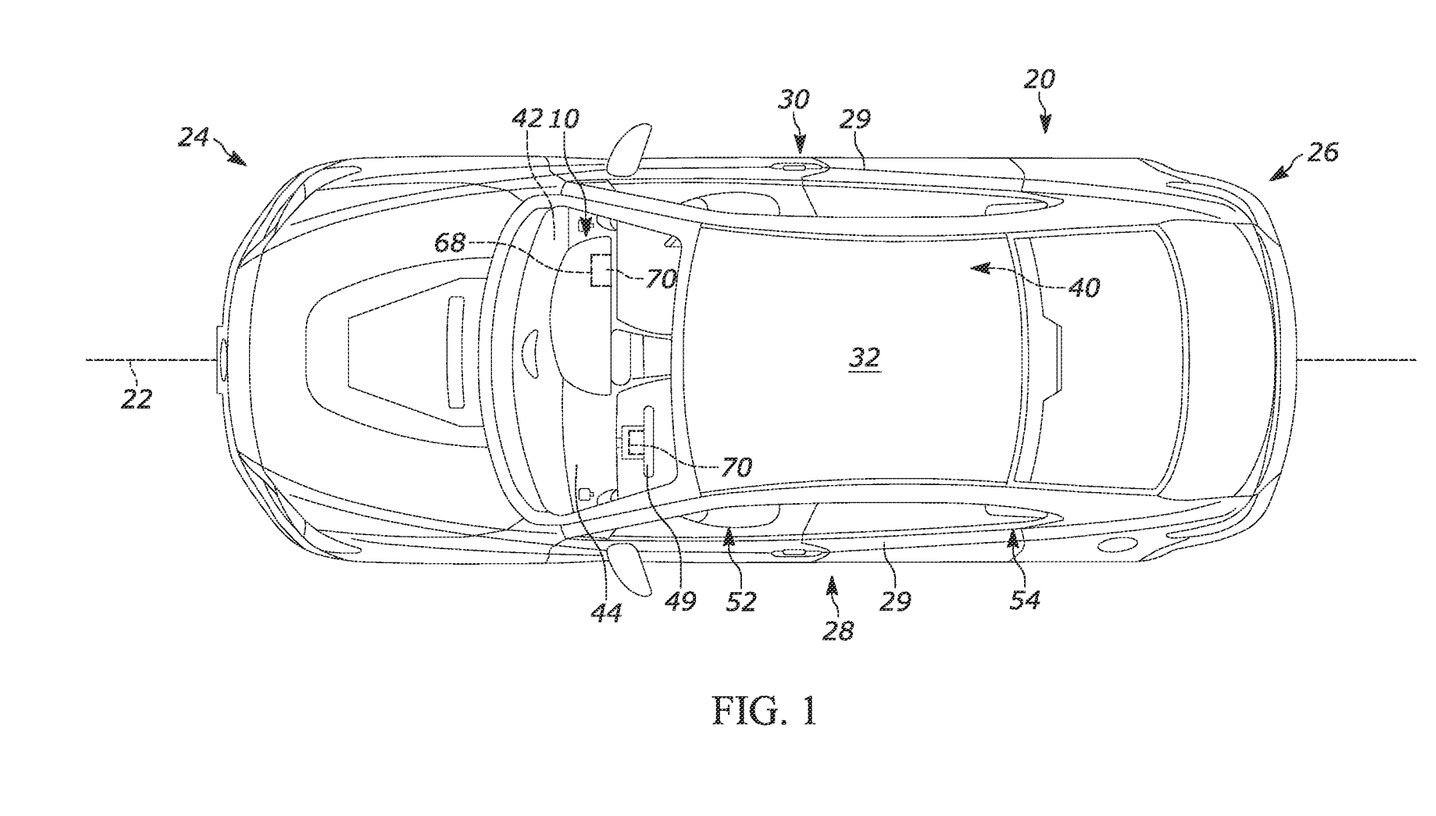
FIG. 1 is a top view of a vehicle including an example occupant restraint system.
Figure 2:
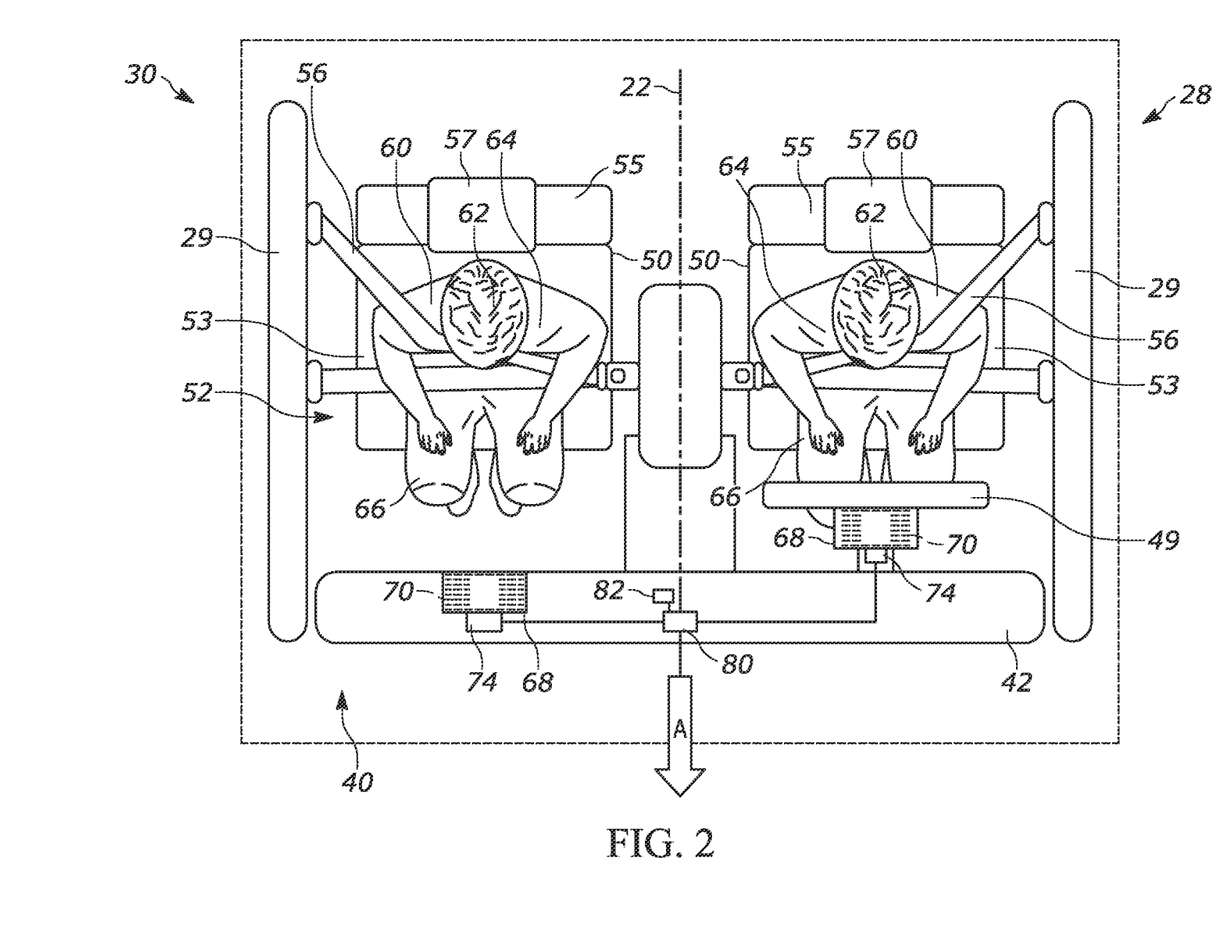
FIG. 2 is a top view of an interior of the vehicle.

Referring to FIGS. 1-2, the vehicle 20 extends along a centerline 22 from a first or fore end 24 to a second or aft end 26. The vehicle 20 extends to a left/driver side 28 and a right/passenger side 30 on opposite sides of the centerline 22. Each side 28, 30 includes side structure 29 including an A-pillar, a B-pillar, a C-pillar, and doors connected to the pillars.

The first end 24 of the vehicle 20 includes an instrument panel 42 facing a passenger compartment or cabin 40. A windshield or windscreen 44 is located between the instrument panel 42 and a roof 32. The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40. In the example shown, a steering wheel 49 extends from the instrument panel 42.

Seats 50 are positioned in the cabin 40. In this open passenger cabin 40 configuration, the vehicle seats 50 can be configured, positioned, and oriented in a variety of manners, not constrained by the need to facilitate a vehicle driver/operator. For example, in FIG. 2, the seats 50 can be arranged in front and rear rows 52 and 54, respectively, oriented in a forward-facing manner similar to that of conventional automobiles. It will be appreciated that the vehicle 20 could alternatively include more or fewer rows of seats 50 (not shown). In any case, a seatbelt 56 is associated with each seat 50 for restraining an occupant 60 in that seat.

Each seat 50 includes a base or bottom 53 for receiving the legs 66 of the occupant 60. A seat back 55 extends from the base 53 towards the roof 32 and receives the upper torso 64 of the occupant 60. A headrest 57 is connected to the seat back 55 and receives the head 62 of the occupant 60.

The occupant restraint system 10 shown in FIGS. 1-2 include vehicle occupant protection devices in the form of inflatable airbags 70 mounted in the instrument panel 42 and/or steering wheel 49 of the vehicle 20 and associated with each seat 50 in the front row 52. The airbag 70 associated with the right or passenger side 30 of the vehicle 20 forms a passenger frontal airbag. The airbag 70 associated with the left or driver side 28 of the vehicle 20 forms a driver frontal airbag. Although the airbags 70 in the instrument panel 42 and steering wheel 49 are similar the construction and operation of only the airbag in the instrument panel and associated with the passenger seat 50 is discussed for brevity.

That said, any reference to an occupant 60 refers to the passenger occupant on the right side 30 of the vehicle 20 as opposed to the driver occupant on the left side 28 (unless otherwise noted). Similarly, any reference to a vehicle seat 50 refers to the seat for receiving the passenger occupant 60 on the right side 30 (unless otherwise noted). It will be appreciated that the geometry of the airbag 70 associated with the steering wheel 49 will be adjusted to conform to the vehicle 20 architecture at/around the steering wheel and driver-side 28 occupant 60.

The airbag 70 is at least one of rolled or folded before being placed in the instrument panel 42, e.g., in the front of the instrumental panel facing rearward in the vehicle 20. The rolled airbag 70 can each be provided in a cover or housing/module 68 that is then placed in instrument panel 42. The module 68 also includes an inflator 74 for providing inflation fluid to the respective airbag 70. The inflator 74 is operatively connected (e.g., by wires) to an airbag controller 80 (see FIG. 2) that includes or communicates with one or more crash sensors 82. The airbag controller 80 is operative to receive signals from the sensor(s) 82, determine the occurrence of a crash event, and actuate the inflator 74 in a known manner to inflate the airbag. The inflator 74 can be of any known type, such as stored gas, solid propellant, augmented or hybrid. The inflator 74 can be a single stage or dual stage inflator.

The airbag 70 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

Upon sensing the occurrence of an event for which inflation of the airbag 70 is desired, such as a vehicle collision, the controller 80 provides signals to the inflator 74. Upon receiving the signals from the controller 80, the inflator 74 is actuated and provides inflation fluid to the inflatable volume of the airbag 70 in a known manner. The inflating airbag 70 exerts a force on the instrument panel 42, which causes the instrument panel to open (e.g., via tear seam or door). This releases the airbag 70 to inflate and deploy from a stored condition behind the instrument panel (indicated by the dashed lines in FIG. 2) to a deployed condition extending into the cabin 40 both directly in front of and laterally in front of the occupant 60 (see FIG. 3). The airbag 70, while inflated, helps protect the vehicle occupant 60 in the seat 50 by absorbing the impact of the occupant.

The shape/configuration of the airbag 70 can be configured to coincide with anatomical features of an occupant 60 selected as a statistical representative of the population. For example, the airbag 70 can be configured to accommodate a $50^{th}$ percentile (50%) male, meaning that the occupant for which the airbag is modeled is a male that is larger than 50% of the male population. Other occupants for which the airbag 70 can be configured are a larger occupant, such as a 75% male, a very large occupant, such as a 95% male, or a small female, such as a 5% female. Sizes within these bounds can also be selected.

Additionally, in protection device parlance, the occupant can be seated in what is referred to herein as a "normal" or "normally" seated position. By this, it is meant that the occupant 60 is seated on the seat 50 with his or her buttocks on the seat base 53, facing forward, with his or her back resting against or near the seat back 55 and head 62 adjacent or near the headrest 57. The occupant 60 can alternatively be seated away from the normal seating position—previously referred to as an out of opposition ("OOP") occupant.

Moreover, the sensor 82 and controller 80 can be configured to detect and determine different types of vehicle 20 crash scenarios, which can require different configurations/deployments of the airbag 70 to help protect the occupant 60. In other words, there are multiple vehicle collision/impact scenarios for which the airbag 70 can help protect the occupant 60. For example, the airbag 70 can help protect the passenger 60 if the vehicle 20 is involved in a frontal impact. A frontal impact is meant to refer to scenarios where the impact results in the occupant 60 moving forward in the vehicle 20 in a direction generally parallel to the vehicle centerline 22 and the direction of forward vehicle travel (see arrow A in FIG. 2-3). In the event of a frontal impact, the occupant 60 moves forward in the vehicle 20 in a direction indicated generally by the arrow labeled C in FIG. 3 towards the instrument panel 42.

The airbag 70 can also help protect the occupant 60 if the vehicle 20 is involved in an oblique and/or offset impact. An offset and/or oblique impact is meant to refer to scenarios where the impact results in the occupant 60 moving obliquely forward in the vehicle 20 in a direction that is non-parallel to the vehicle centerline 22 and the direction of forward vehicle travel (see arrow A). For example, a left oblique impact can occur on the driver side 28 of the vehicle 20 in response to, for example, the vehicle skidding at an angle into another vehicle or barrier, or in response to being struck by another vehicle moving at an angle. The left oblique impact is illustrated generally by the double arrow labeled D in FIG. 4.

Similarly, a right oblique impact can occur on the passenger side 30 of the vehicle 20 in response to, for example, the vehicle skidding at an angle into another vehicle or barrier, or in response to being struck by another vehicle moving at an angle. The right oblique impact is illustrated generally by the double arrow labeled E in FIG. 4.

Figure 4:
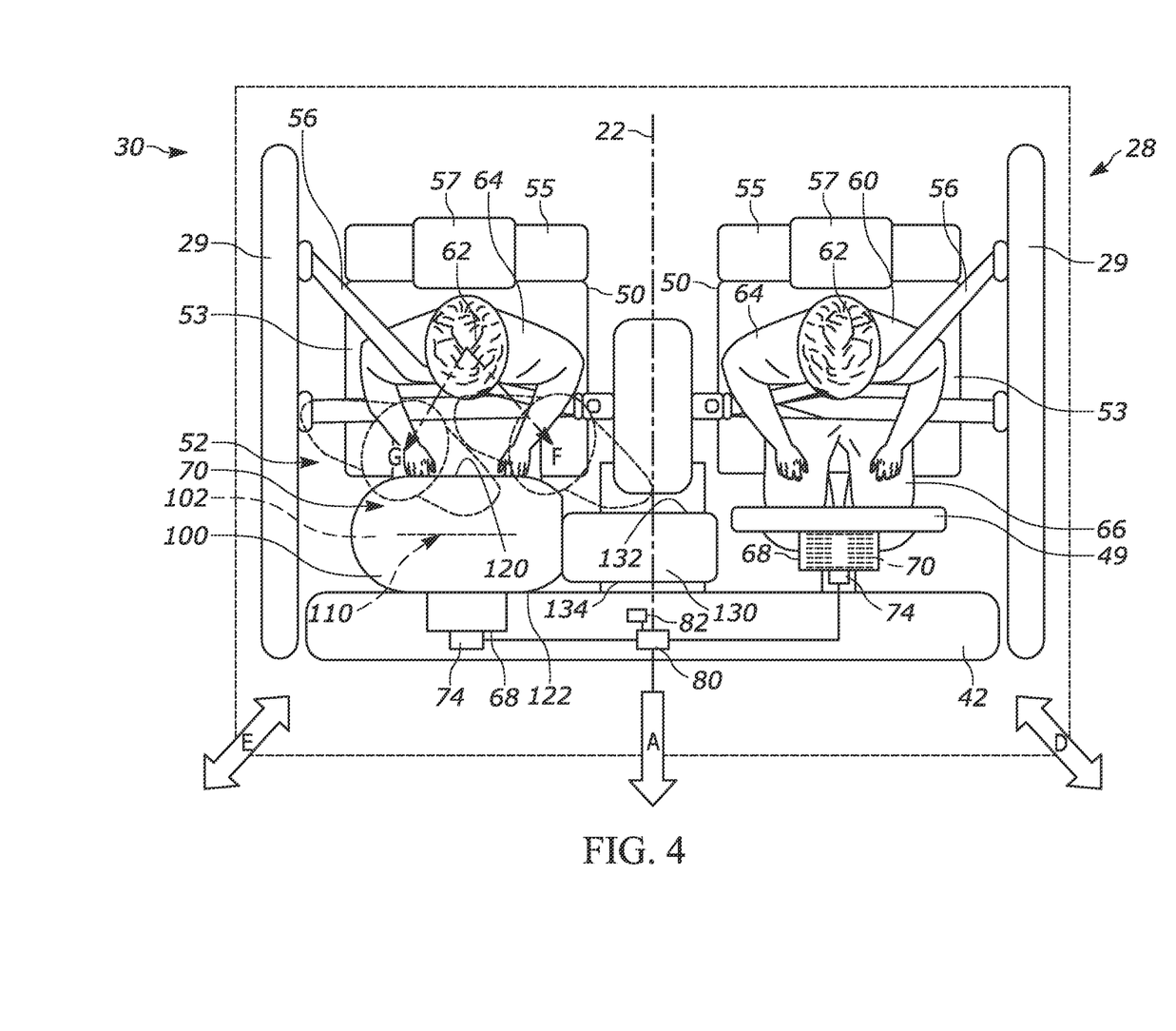
FIG. 4 is a top view of the interior of the vehicle of FIG. 2 during an oblique vehicle crash with an example airbag of the occupant restraint system in a deployed condition.

In the event of an offset and/or oblique impact, the occupant 60 moves forward in the vehicle 20 in a direction that is angled either inboard of the vehicle (i.e., toward the vehicle centerline 22) or outboard of the vehicle (i.e., toward the vehicle side structures 29). For example, the occupant 60 moves inboard (arrow F) in the event of a left oblique impact and moves outboard (arrow G) in the event of a right oblique impact.

With this in mind, the airbag 70 shown and described herein is advantageously configured to help protect occupants falling within predetermined statistical representations of the population and being seated normally or out of position when a frontal, side or oblique vehicle crash occurs.

Figure 3:
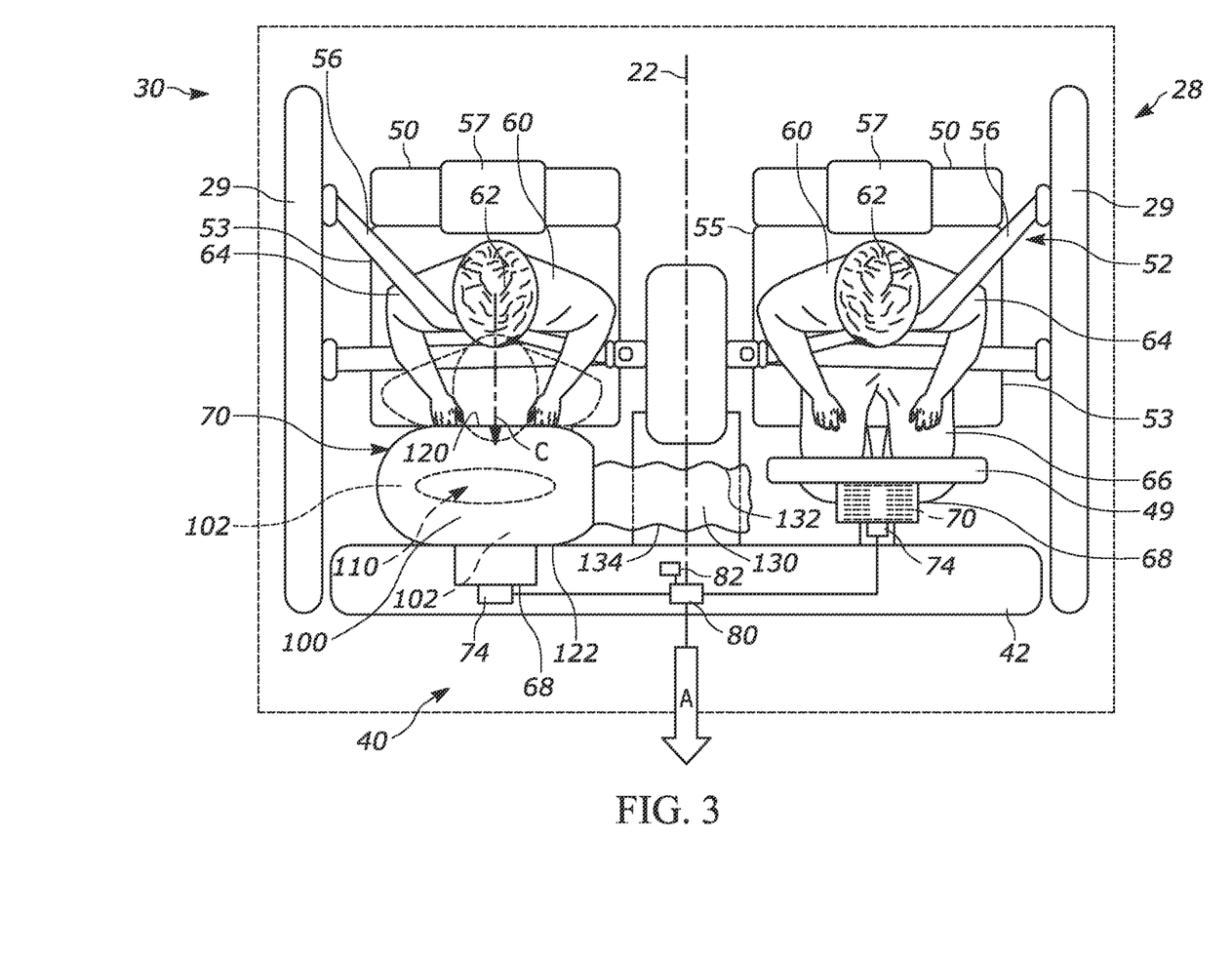
FIG. 3 is a top view of the interior of the vehicle of FIG. 2 during a frontal vehicle crash with an example airbag of the occupant restraint system in a deployed condition.

In the deployed condition shown in FIG. 3, the airbag 70 includes a primary chamber 100 and a secondary chamber 130. The primary chamber 100 covers a portion of the vehicle 20 and helps to provide protection to the occupant 60 from impacts with the covered portion of the vehicle in the event of a frontal and/or outboard oblique event. In particular, in the example configuration depicted in FIGS. 2-3, when inflated and in the deployed condition, the primary chamber 100 of the airbag 70 is disposed directly forward (as viewed in the direction of arrow A) of the vehicle seat 50 in which the occupant 60 is seated.

To this end, the primary chamber 100 covers the portions of the instrument panel 42 presented in front of the passenger-side 30 vehicle seat 50 and spans substantially across the width of the passenger-side vehicle seat. The primary chamber 100 of the airbag 70 helps protect the occupant 60 from impacts with the instrument panel 42 by cushioning impacts with the occupant and helping to provide a controlled deceleration or "ride down" effect. Because the passenger occupant 60 is not charged with operating the vehicle 20, his or her position in the passenger-side vehicle seat 50 can vary. As a result, the primary chamber 100 of the airbag 70 is configured to cover a large inboard-outboard area of the instrument panel 42.

The secondary chamber 130 is configured for helping to protect the occupant 60 in the event of at least one of an offset and/or oblique crash event. The secondary chamber 130 has a stored condition and is inflatable to a deployed condition to cover portions of the vehicle 20 left uncovered by the primary chamber 100. In other words, the secondary chamber 130 supplements the protection afforded by the primary chamber 100 by extending lateral coverage of the airbag 70 within the vehicle 20.

In particular, the secondary chamber 130, when inflated and in the deployed condition, extends laterally inboard from the primary chamber 100 toward and even beyond the vehicle centerline 22. In other words, when the secondary chamber 130 is inflated and deployed, the secondary chamber covers a portion of the instrument panel 42 position laterally inboard of at least one of the primary chamber 100 and the passenger-side vehicle seat 50.

The secondary chamber 130 can be positioned adjacent, touching, or near the instrument panel 42 and can be configured to receive an occupant 60 moving in an oblique direction in the vehicle 20. Thus, the secondary chamber 130 can be configured to cover a portion of the instrument panel 42 where an occupant 60 could strike in the event of an oblique and/or offset collision.

The secondary chamber 130 is connected to the primary chamber 100 in a manner such that their respective inflatable volumes are fluidly connected with each other. In this manner, the inflator 74 is actuatable to provide the inflation fluid for inflating both the primary chamber 100 and the secondary chamber 130. The primary chamber 100 and the secondary chamber 130 can thus be deployed simultaneously, or substantially simultaneously, given that inflation fluid entering the secondary chamber would first pass through the primary chamber.

The configuration of the primary and secondary chambers 100, 130, and the portions of the vehicle (instrument panel 42, etc.) that they cover, can vary depending on the architecture of the vehicle 20 in which it is installed. In the embodiment of FIGS. 1-6, the primary and secondary chambers 100, 130 have a generally rectangular configuration with the primary chamber having a total inflated volume that is greater than a total inflated volume of the secondary chamber. The configuration of the primary and secondary chambers 100, 130 could, however, differ.

For instance, when the airbag 70 is configured for placement in the steering wheel 49, the secondary chamber 130 can have a greater depth in the forward-rearward direction of the vehicle 20 to account for the steering wheel position rearward of the instrument panel 42. In other words, the chambers 100, 130 for the airbag 70 associated with the driver-side occupant 60 would be offset from one another in the forward-rearward direction compared to the airbag associated with the passenger-side occupant to account for differences in vehicle 20 architecture between the two vehicle sides 28, 30.

Figure 5:
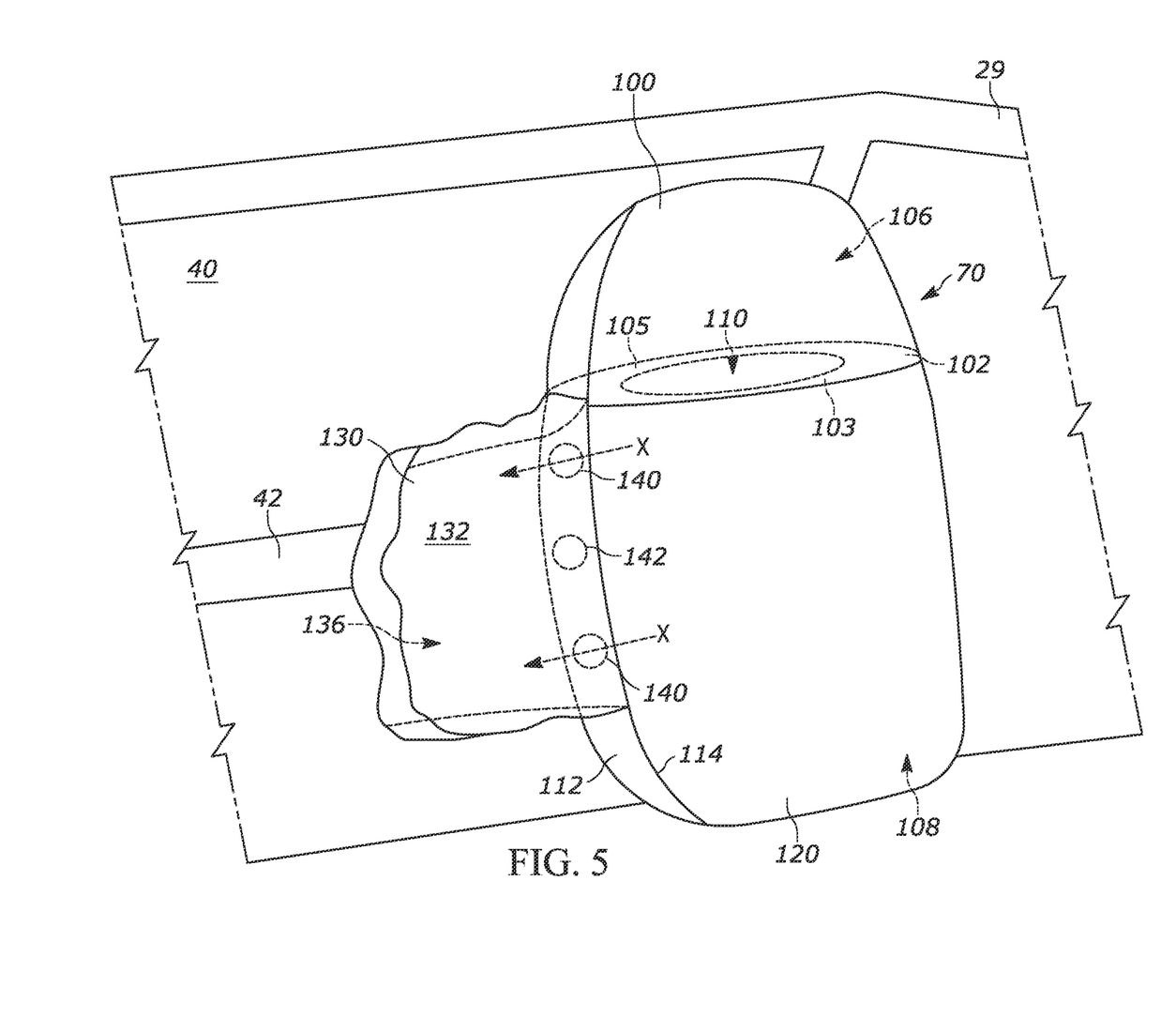
FIG. 5 is a perspective illustration of the airbag of FIG. 3.
Figure 6:
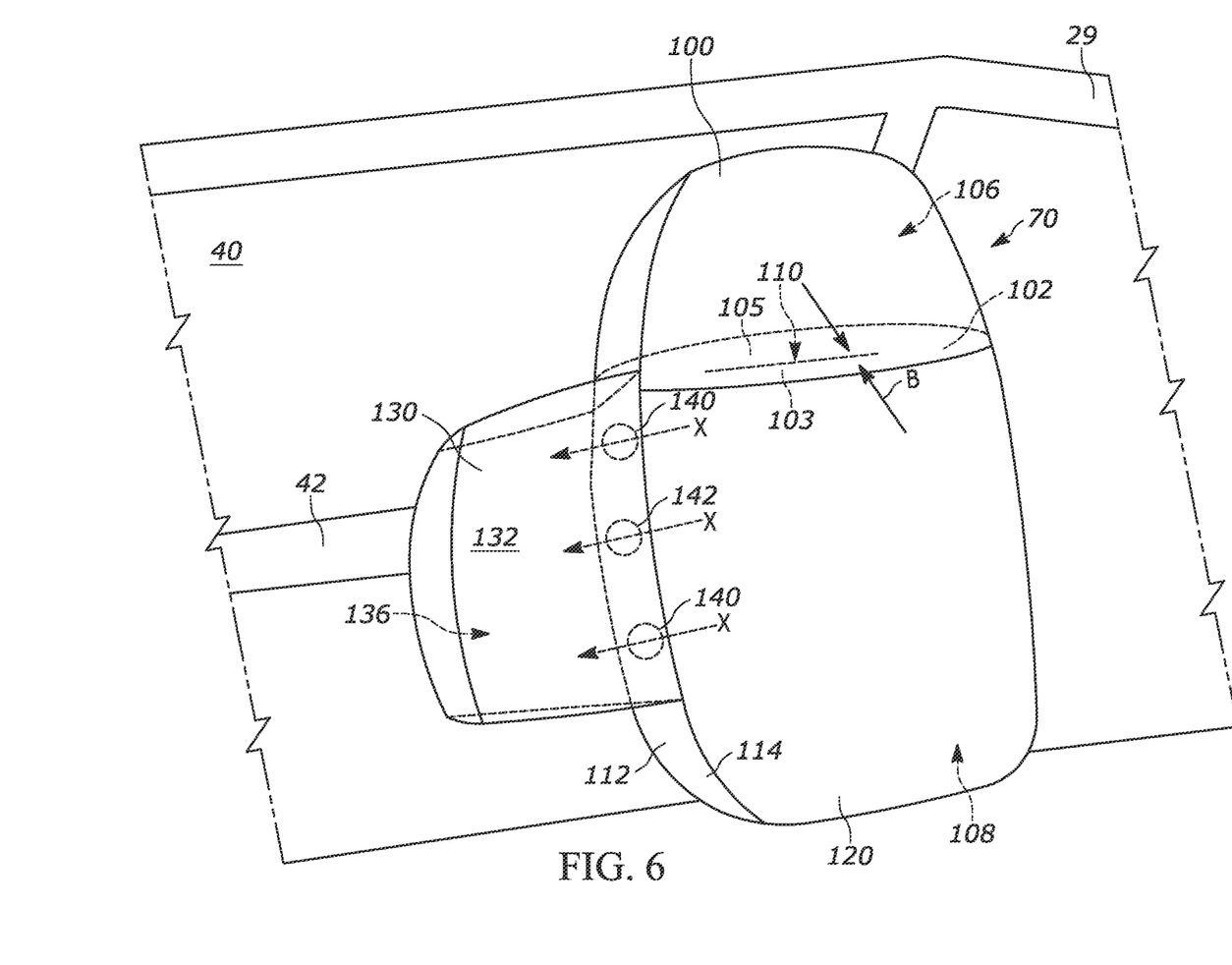
FIG. 6 is a perspective illustration of the airbag of FIG. 4.

FIGS. 5-6 illustrate more specific details of the primary chamber 100 and the secondary chamber 130. The configurations of the primary chamber 100 and the secondary chamber 130 of the passenger front airbag 70 illustrated in FIGS. 5-6 are not, however, meant to limit the use of the secondary chamber to the illustrated configuration nor to exclude use of the secondary chamber from other frontal airbag configurations. In fact, the secondary chamber 130 can be implemented in any airbag in which auxiliary coverage/protection is desired.

For example, although the secondary chamber 130 is shown and described as being attached to the primary chamber 100 in order to supplement the protection afforded thereby, the secondary chamber may be attached to, and supplement the projection afforded by any conventional airbag structure, such as, but not limited to, the driver frontal airbag, any frontal airbag, a door-mounted side impact airbag, a seat-mounted side impact airbag, a pillar airbag, a curtain airbag, a frontal airbag for rear seat occupants, a knee bolster, or an inflatable seatbelt (not shown).

That said, the primary chamber 100 of the airbag 70 has a generally rectangular configuration. The primary chamber 100 includes a side wall 112 and a pair of panels 120, 122 interconnected by a side seam 114. The panel 120 is a rear panel facing the occupant 60. The panel 122 is a front panel facing the instrument panel 42. An interior panel 102 is secured to the panels 120, 122 and side wall 112 and divides the primary chamber 100 into a pair of inflatable volumes, namely, lower and upper inflatable volumes 108, 106, respectively.

At least one opening 110 extends through the interior panel 102 and defines at a passive vent for selectively venting inflation fluid between the inflatable volumes 108, 106. More specifically, the interior panel 102 includes opposing portions 103, 105 that are initially spaced apart to define the opening 110 (or multiple openings). Consequently, the rate of inflation fluid flow from the lower inflatable volume 108 into the upper inflatable volume 106 can be controlled based on the dimensions and/or location of the opening 110.

The opening 110 forms a one-way or non-return vent structured to restrict a return flow of gases from the upper inflatable volume 106 back into the lower inflatable volume 108. To this end, the opening 110 is configured to automatically close in response to the occurrence of a pressure differential between the lower and upper inflatable volumes 108, 106 tending to force gas in a direction from the lower inflatable volume into the upper inflatable volume. Closure of the opening 110 in response to this pressure differential helps maintain a prolonged, sustained fluid pressure in the lower inflatable volume 108.

The secondary chamber 130 includes a pair of panels 132, 134 interconnected to define an inflatable volume 136. The panel 132 is a rear panel facing the occupant 60. The panel 134 is a front panel facing the instrument panel 42. The secondary chamber 130 can be connected to the primary chamber 100 at or near the side wall 112 such that the side wall separates the primary and secondary chambers. The chambers 100, 130 can be secured together by connections such as stitching, ultrasonic welding, and adhesive bonding.

At least one passive vent 140 can be provided in the side wall 112 that separates the primary and secondary chambers 100, 130 to establish fluid communication between the primary and secondary chambers. As shown, multiple passive vents 140 are provided in the side wall 112. Since the inflator 74 is directly fluidly connected to the primary chamber 100 (e.g., at the lower inflatable volume 106) the passive vents 140 allow the secondary chamber 130 to receive inflation fluid from the primary chamber 100.

The passive vents 140 are therefore configured to direct inflation fluid from the primary chamber 100 to the secondary chamber 130. In some example configurations, the passive vents 140 may allow for the free flow of inflation fluid in both directions. In other example configurations, the at least one passive vent 140 may be one-directional (e.g., allowing inflation fluid flow from the primary chamber 100 to the secondary chamber 130, but not from the secondary chamber to the primary chamber). Both the primary and secondary chambers 100, 130 may be free from any vents for venting inflation fluid external to the airbag 70. Thus, any inflation fluid provided to the primary chamber 100 either remains in the primary chamber or is recycled into the secondary chamber 130.

At least one active vent 142 is also disposed in the side wall 112 and is actuatable to selectively provide additional fluid communication between the primary and secondary chambers 100, 130. To this end, the active vent 142 is actuatable between a closed condition (FIG. 5) in which inflation fluid does not flow through the at least one active vent and an open condition (FIG. 6) venting inflation fluid therethrough from the primary chamber 100 to the secondary chamber 130. In the example shown, the active vent 142 is actuated closed and therefore normally open. In this sense, the active vent 142 is controlled to either permit (maintained or held open) or prevent (actuated closed) inflation fluid flow therethrough.

In some example configurations, the active vent 142, when in the opened condition, may allow for the free flow of inflation fluid in both directions. In other example configurations, the active vent 142, when in the opened condition, may be one-directional (e.g., allowing inflation fluid flow from the primary chamber 100 to the secondary chamber 130, but not from the secondary chamber to the primary chamber). It will be appreciated that the passive vents 140 can be omitted such that the at least one active vents 142 provide the only fluid communication between the chambers 100, 130.

FIGS. 5-6 depict inflation and deployment of the airbag 70 at similar predetermined points in time upon activation of the inflator 74. FIG. 5 depicts a situation where the active vent 142 is actuated and, thus, in the closed condition (controlled closed). When the active vent 142 is in the closed condition, only the passive vents 140 direct inflation fluid from the primary chamber 100 to the secondary chamber 130 upon the activation of the inflator 74. The inflation fluid flow through the passive vents 140 is indicated by the two arrows X in FIG. 5.

On the other hand, FIG. 6 depicts a situation where the active vent 142 is not actuated, and thus, in the opened condition (controlled open). When the active vent 142 is in the opened condition, the active vent and the passive vents 140 cooperate to direct inflation fluid from the primary chamber 100 to the secondary chamber 130 upon the activation of the inflator 74. The inflation fluid flow through the vents 140, 142 is indicated by the three arrows "X".

A flow rate of the inflation fluid flowing from the primary chamber 100 into the secondary chamber 130 when the active vent 142 is not actuated is greater than a flow rate of the inflation fluid flowing from the primary chamber to the secondary chamber when the active vent is actuated due to the inflation fluid having at least one more vent to flow through. The increase in flow rate allows the secondary chamber 130 to inflate to the deployed position faster when the active vent 142 is not actuated than when the active vent is actuated. Consequently, the secondary chamber 130 is more fully inflated at the same point in time when the at least one active vent 142 is opened (FIG. 6) compared to closed (FIG. 5).

With this in mind, if the controller 80 determines or senses via the sensor 82 that the collision event is a frontal collision, the active vent 142 is actuated to the closed condition and only the passive vents 140 direct inflation fluid from the primary chamber 100 to the secondary chamber 130 (FIG. 5) This allows the primary chamber 100 to inflate and deploy more rapidly to accommodate the occupant 60 moving forward towards the instrument panel 42 in the direction C. In other words, placing the active vent 142 in the closed condition allows the primary chamber 100 to inflate and deploy more rapidly and maintain pressure during occupant 60 penetration. It will be appreciated that the controller 80 can also be configured to actuate the active vent 142 to the closed condition in response to determining that the collision event is a right oblique impact E causing the occupant 60 to move in the forward outboard direction G.

The primary chamber 100 can help protect the occupant 60 in the event of a left oblique impact D, but not necessarily to the extent it is capable of protecting the occupant in a frontal impact. The degree to which the primary chamber 100 can help protect the occupant 60 in a left oblique impact D depends on the degree to which the occupant movement deviates from the forward direction (i.e., the angle between arrow A and D in FIG. 4). As the degree to which the occupant movement deviates from the forward direction, i.e., as the angle increases, the ability of the primary chamber 100 to help protect the occupant 60 also decreases. Thus, as the occupant's movements becomes increasingly inboard oblique, the ability of the primary chamber 100 to help protect the occupant 60 decreases.

That said, the secondary chamber 130 can help address some unique challenges presented by oblique and/or offset impacts. For example, when oblique impacts can cause the occupant 60 to move in a forward and inboard direction (arrow F), the occupant moves toward the position indicated generally in dashed lines in FIG. 4. Of course, the oblique direction in which the occupant 60 moves, and their resulting position, can vary depending on the particulars of the impact event, such as the angle and/or velocity at which the vehicle 20 impacts another vehicle or object. Therefore, the oblique inboard direction of occupant 60 movement indicated by arrow F and the resulting position of the occupant is by way of example only.

The primary chamber 100 of the airbag 70 may be more adept at reacting to and absorbing or otherwise cushioning both forward and inboard occupant movement due to its increased size and coverage of the instrument panel 42. Nevertheless, there still exists some areas, such as central portions of the instrument panel, that may lack adequate coverage. Additionally, the occupant 60 is more likely to be positioned away from the traditional/normal seating position at the time of the oblique impact. These out of position occupants can, for example, be leaned against the side structure 29, can have the seat 53 in a reclined position, can be leaned forward or toward the vehicle centerline 22. Forward-inboard movement of an out of position occupant 60 can also result in the primary chamber 100 of the airbag 70 providing less than adequate coverage, as the passenger could "miss" or partially "hit" the primary chamber. Forward-inboard movement of the occupant 60 can also present the possibility that the passenger can escape the shoulder belt portion of the seatbelt 56.

Advantageously, the secondary chamber 130, both alone and in combination with the primary chamber 100, can help protect the occupant 60 in the event of an oblique condition (left oblique D, right oblique E) that results in forward-inboard occupant movement (arrow F). To this end, the secondary chamber 130 is configured to cooperate with the architecture of the vehicle 20 in order to provide the bag with the structural integrity necessary to help protect the occupant 60. The forward-inboard oblique and/or offset collision is unique in that the occupant restraint system 10 must react to and absorb or otherwise cushion both forward and inboard occupant movement.

The secondary chamber 130 can be shaped commensurate with the vehicle structure and the primary chamber 100 from which it is deployed. In the illustrated example configuration, the secondary chamber 130 can have a generally rectangular configuration. The shape of the secondary chamber 130 is not as important to its configuration as is the need to provide coverage to the desired portion of the uncovered area between the primary chamber 100 and the driver frontal airbag/steering wheel. To this extent, the secondary chamber 130 can span the space between the primary chamber 100 and the steering wheel 49 and can even engage the driver frontal airbag (not shown)

Additionally, because the secondary chamber 130 is connected to the primary chamber 100 and receives its inflation fluid from the primary chamber, the primary chamber can deploy substantially prior to the secondary chamber. In this manner, the primary chamber 100 can initially deploy rearward in the vehicle 20 toward its deployed position. When the primary chamber 100 reaches a certain degree of inflation and pressurization, the secondary chamber 130 will begin receiving inflation fluid and begin to deploy. The primary chamber 100 can thus deploy partially and/or substantially before the secondary chamber 130. The primary chamber 100 can deploy rearward in the vehicle 20, followed by the secondary chamber 130, which deploys laterally in the vehicle.

Since the secondary chamber 130 has a smaller volume than the primary chamber 100, it will inflate and deploy quickly so as to reach the desired position within the desired period of time. Advantageously, this also allows the large volume primary chamber 100 to inflate and deploy quickly because the secondary chamber 130 does not divert a significant volume of inflation fluid from the primary chamber.

Although the secondary chamber 130 is illustrated and described as being implemented with the airbag 70, the secondary chamber 130 could have alternative implementations. For example, the secondary chamber 130 could be implemented with the driver frontal airbag in the steering wheel 49. In this implementation, the secondary chamber 130 could have a radial configuration and extend radially from the driver frontal airbag. As another implementation, the secondary chamber 130 could be implemented in a driverless automobile, where it is envisioned that the entire steering wheel 49 may not necessarily rotate in the traditional sense, instead, for example, only the steering wheel rim moves or rotates in a steer-by-wire system.

In any case, because the flow rate between the primary chamber 100 and the secondary chamber 130 is increased when the active vent 142 is not actuated, the active vent is configured to remain un-actuated in response to detecting an occurrence of an event for which a more rapid inflation of the secondary chamber is desired (e.g., the offset and/or oblique vehicle crash) (see FIG. 6). That said, if at the time of a collision event it is determined that the collision event is at least one of an offset collision and an oblique collision, the active vent 142 is not actuated and therefore remains in the open condition so that the active vent and the passive vents 140 cooperate to direct inflation fluid from the primary chamber 100 to the secondary chamber 130.

During an oblique or offset collision resulting in forward occupant 60 movement in the direction F, the occupant 60 will impact the panel 132 (FIG. 5), thereby loading the secondary chamber 130. When this occurs, a pressure differential is generated between the lower and upper inflatable volumes 108, 106. More specifically, when the occupant 60 strikes the panel 132, inflation fluid is forced back through the open vents 140, 142 into the lower inflatable volume 108, thereby pressurizing the same to a greater degree relative to the upper inflatable volume 106. This causes the opposing portions 103, 105 of the interior panel 102 to automatically collapse toward one another in the manner indicated generally by the arrows B in FIG. 6.

Ultimately, the portions 103, 105 of the panel 102 contact one another and completely close the opening 110 to prevent the flow of inflation fluid therethrough. Inflation fluid is therefore prevented from flowing from the lower inflatable volume 108 to the upper inflatable volume 106. Due to the increased and maintained fluid pressure in the lower inflatable volume 108, the fluid pressure in the secondary chamber 130 is likewise increased and maintained. In other words, closing the opening 110 results in an elevated pressure in the secondary chamber 130 that is maintained to help absorb impact forces between the occupant 60 and the secondary chamber during an oblique or offset collision. It will be appreciated that once the opening 110 is closed, the controller 80 can actuate the active vent 142 closed at any time to tailor the stiffness of the airbag 70 during occupant penetration.

Example configurations for the active vent 142 are shown and described in U.S. Pat. No. 10,730,472, the entirety of which is incorporated herein by reference. It will be appreciated that the active vent 142 can be actuated closed/normally open (as shown and described) or actuated open/normally closed. One such example of the latter configuration is shown in FIGS. 7-8.

Figure 7:
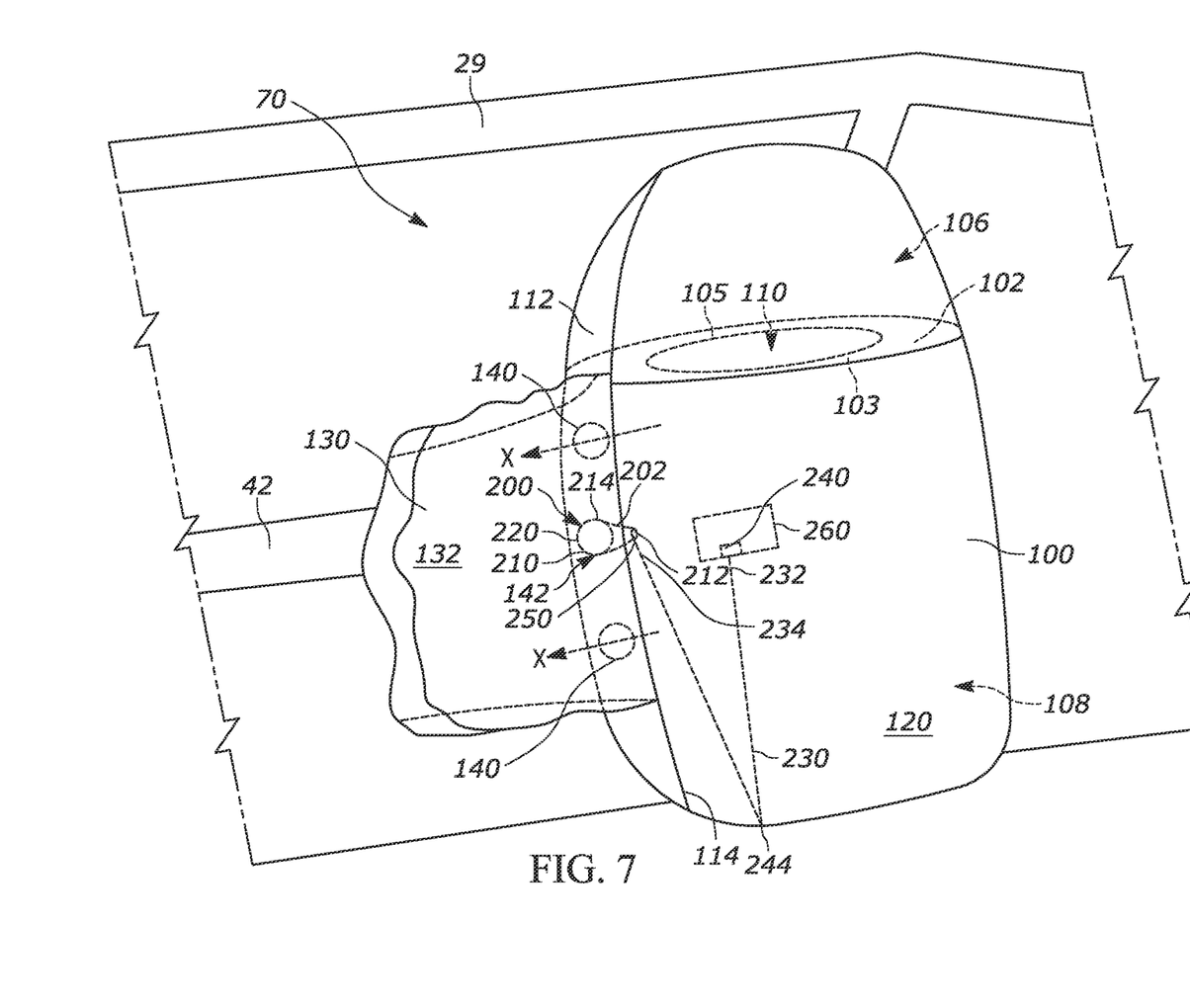
FIG. 7 is a perspective illustration of a portion of the vehicle safety system with an element in a first example configuration.
Figure 8:
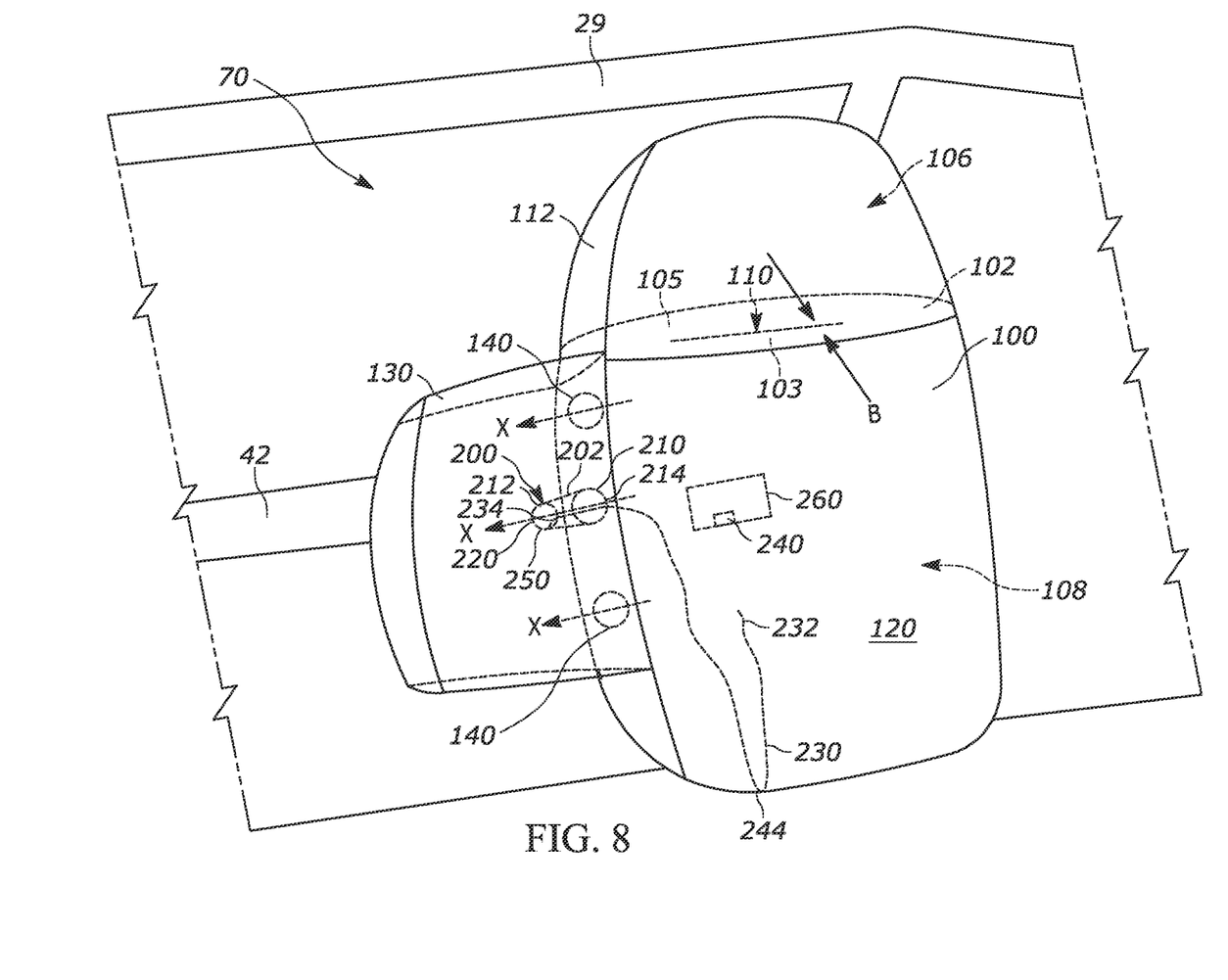
FIG. 8 is a perspective illustration of a portion of the vehicle safety system with an element in a second example configuration

The active vent 142 configuration of FIGS. 7-8 includes a vent opening 200, such as a slit or hole, that extends through the side wall 112 that separates the primary chamber 100 from the secondary chamber 130. The vent opening 200 shown has a generally circular shape or configuration. Those skilled in the art, however, will appreciate that the vent opening 200 may have any desired shape or configuration.

An annular or tube-shaped piece of material 202 overlies a portion of the airbag material extending around a periphery 210 of the vent opening 200. The piece 202 includes a central opening 212 that coincides with the vent opening 200 when the piece 202 is connected to the portion of the side wall 112. The piece 202 and portion 204 are interconnected by known means, such as stitching, ultrasonic welding, heat bonding, or adhesives. The piece of material 202 includes a rim 214 opposite to the portion of the material that is connected to the portion of the side wall 112. The rim 214 has a passage or channel 220 that extends circumferentially about the rim.

A tether 230 is provided for actuating the active vent 142. In the embodiment illustrated in FIGS. 7-8, the tether 230 is positioned inside the primary chamber 100. The tether 230 has a first end portion 232 that is releasably connected to a release device 240 by known means. The release device 240 can be positioned within any part of the vehicle 20, such as in a housing 260. The release device 240 may, for example, be an actuatable fastener, such as a pyrotechnic bolt, that is actuatable to break or release the connection between the release device and the first end portion 232 of the tether 230.

Those skilled in the art will appreciate that alternative release devices 240 could be utilized. For example, the release device 240 may comprise an actuatable latch, a solenoid mechanism, or actuatable cutters or shears. A second end portion 234 of the tether 230, opposite the first end portion 232, is associated with the active vent 142. The tether 230 can have a deflection 244 at a location between the release mechanism 240 and the active vent 142. As shown, the deflection 244 is connected to a lower end of the primary chamber 100.

The tether 230 may be constructed of any material suited to perform the functions described herein. For example, in one particular construction, the tether 230 may comprise a narrow, elongated strip of fabric material, such as a woven nylon webbing. The tether 230 may, for example, have a width of approximately three-eighths of an inch, a thickness of approximately two millimeters, and a length dependent upon the configuration of the primary chamber 100, the configuration of the vehicle 20, or both.

The second end portion 234 of the tether 230 is configured to form a loop 250 that enters the channel 220. The loop 250 extends at least partially through the channel 220 and thus at least partially encircles or surrounds the rim 214. The loop 250 is configured to have a size or diameter that reduces or constricts in response to tension forces applied to the tether 230 in a manner similar or identical to a slip knot or noose. As described below, the looped configuration of the tether 230 acts as a drawstring for drawing closed the vent opening 200.

The tether 230 cooperates with the channel 220 to serve as a drawstring that closes the active vent 142, i.e., the vent opening 200, when the tether is tensioned. To this end, tensioning the tether 230 reduces the size or circumference of the loop 250, which, because the loop extends through the channel 220, constricts or otherwise draws closed the vent opening 200. The tension applied to the tether 230 may thus place and maintain the active vent 142 in the closed condition.

By actuating the active vent 142 to the "closed" condition, it is meant that the size of the vent opening 200 is reduced to a degree sufficient to stop or reduce the flow of inflation fluid through the active vent. Those skilled in the art will appreciate that the active vent 142, when in the closed condition, may still permit some degree of inflation fluid flow. The degree of inflation fluid flow through the active vent 142 when in the closed condition is, however, less or substantially less than the degree of inflation fluid flow through the active vent when in the opened condition.

With this in mind, when an occurrence of an event for which inflation of the airbag 70 is desired, such as a collision event, the inflator 74 is actuated to provide inflation fluid to the primary chamber 100. As the primary chamber 100 inflates, the tether 230 is tensioned. Thus, during an initial deployment phase of the airbag 70, the active vent 142 can be in the closed condition. If it is determined that the collision event is not an event for which a more rapid inflation of the secondary chamber 130 is desired (e.g., the collision event is not at least one of an offset and oblique collision event), the release device 240 is not actuated to release the first end portion 232 of the tether 230 so that the connection between the release device and tether is maintained. Consequently, the active vent 142 remains in the closed condition.

However, if it is determined that the collision event is an event for which a more rapid inflation of the secondary chamber 130 is desired (e.g., at least one of an offset and oblique collision event), the release device 240 is actuated to release the first end portion 232 of the tether 230 to allow the active vent 142 to move to the open condition, as shown in FIG. 8. In other words, when the collision event is at least one of an offset and oblique collision event, the active vent 142 is actuated so that inflation fluid is directed from the primary chamber 100 to the secondary chamber 130 through the active vent.

From the above description of the invention, those skilled in the art will perceive improvements, changes and modifications. For example, although the present invention has been described and illustrated in an airbag implementation, those skilled in the art will appreciate that the present invention may have other alternative implementations, such as a driver frontal airbag implementation. Such improvements, changes and modifications within the skill of the art are intended to be covered by the appended claims.

Having described the invention, the following is claimed:

1. An apparatus for helping to protect an occupant of a vehicle, comprising:
   an airbag comprising a primary chamber and a secondary chamber fluidly connected thereto by a first passive vent and an active vent having an open condition and a closed condition,
   the primary chamber having a stored condition and being inflatable to a deployed condition to cover a portion of the vehicle and to help provide protection from impacts with the covered portion of the vehicle, an interior panel dividing the primary chamber into upper and lower inflatable volumes and including a second passive vent fluidly connecting the upper and lower inflatable volumes,
   the secondary chamber having a stored condition and being inflatable to a deployed condition to cover portions of the vehicle left uncovered by the primary chamber; and
   an inflator actuatable to provide inflation fluid to the primary chamber to inflate the primary chamber, wherein the active vent is controllable to prevent fluid communication between the primary and secondary chambers in response to occupant penetration into the primary chamber and controllable to allow fluid communication between the primary and secondary chambers in response to occupant penetration into the secondary chamber, and wherein the second passive vent automatically closes to prevent fluid flow from the lower inflatable volume to the upper inflatable volume in response to occupant penetration into the secondary chamber.

2. The apparatus recited in claim 1, wherein the second passive vent comprises an opening defined between opposing portions of the interior panel.

3. The apparatus recited in claim 2, wherein a pressure differential between the lower and upper inflatable chambers causes the opposing portions to automatically move into engagement with one another to close the opening in response to occupant penetration into the secondary chamber.

4. The apparatus recited in claim 1, wherein a flow rate of the inflation fluid flowing from the primary chamber into the secondary chamber when the active vent is not actuated is greater than a flow rate of the inflation fluid flowing from the primary chamber to the secondary chamber when the active vent is actuated.

5. The apparatus recited in claim 1, further comprising a controller configured to actuate the inflator in response to detecting the occurrence of an event for which inflation of the airbag is desired, and wherein the controller is configured to maintain the active vent in the open condition in response to detecting the occurrence of an event for which a more rapid inflation of the secondary chamber is desired.

6. The apparatus recited in claim 5, wherein the event for which a more rapid inflation of the secondary chamber is desired comprises at least one of an offset collision and an oblique collision.

7. The apparatus recited in claim 1, further comprising:
a tether connected to the airbag and the active vent for maintaining the active vent in the closed condition; and
a release device in communication with a controller and releasably connected to the tether;
wherein the controller is configured to actuate the release device to release the connection between the release device and the tether to place the active vent in the open condition in response to detecting the occurrence of an event for which a more rapid inflation of the secondary chamber is desired.

8. The apparatus recited in claim 7, wherein the event for which a more rapid inflation of the secondary chamber is desired comprises at least one of an offset collision and an oblique collision.

9. The apparatus recited in claim 1, further comprising:
a tether connected to the airbag and the active vent for maintaining the active vent in the closed condition; and
a release device in communication with a controller and releasably connected to the tether;
wherein the controller is configured to not actuate the release device and maintain the connection between the release device and the tether to keep the active vent in the closed condition in response to detecting a frontal vehicle crash.

10. The apparatus recited in claim 1, wherein the primary chamber, when inflated, is disposed directly forward of a vehicle seat in which the occupant is seated, and the secondary chamber, when inflated, is laterally inboard of the primary chamber.

11. The apparatus recited in claim 1, wherein the airbag is inflatable between an instrument panel of the vehicle and a passenger-side vehicle seat, and wherein the primary chamber, when inflated and deployed, covers a portion of the instrument panel that is presented in front of the passenger-side vehicle seat and spans at least substantially across the width of the passenger-side vehicle seat.

12. The apparatus recited in claim 11, wherein when the secondary chamber is inflated and deployed, the secondary chamber covers a portion of the instrument panel positioned laterally inboard of the primary chamber.

13. The apparatus recited in claim 11, wherein when the secondary chamber is inflated and deployed, the secondary chamber covers a portion of the instrument panel positioned laterally inboard of the passenger-side vehicle seat.

14. The apparatus recited in claim 1, wherein when the secondary chamber is inflated and deployed, the secondary chamber is configured to receive an occupant moving in an oblique direction in the vehicle.

15. The apparatus recited in claim 1, wherein the active vent is actuatable to place the active vent in the closed condition to prevent fluid communication between the primary and secondary chambers in response to occupant penetration into the primary chamber.

16. The apparatus recited in claim 1, wherein the active vent is maintained in the closed condition to prevent fluid communication between the primary and secondary chambers in response to occupant penetration into the primary chamber.

17. The apparatus recited in claim 1, wherein both of the primary and secondary chambers are free from any vents for venting inflation fluid external to the airbag.

18. An airbag module comprising the apparatus of claim 1.

19. A vehicle safety system comprising the airbag module of claim 18.

20. An apparatus for helping to protect an occupant of a vehicle, comprising:
an airbag comprising a primary chamber and a secondary chamber fluidly connected thereto by a first passive vent and an active vent having an open condition and a closed condition, wherein both of the primary and secondary chambers are free from any vents for venting inflation fluid external to the airbag,
the primary chamber having a stored condition and being inflatable to a deployed condition to cover a portion of the vehicle and to help provide protection from impacts with the covered portion of the vehicle, an interior panel dividing the primary chamber into upper and lower inflatable volumes and including a second passive vent comprising an opening fluidly connecting the upper and lower inflatable volumes,
the secondary chamber having a stored condition and being inflatable to a deployed condition to cover portions of the vehicle left uncovered by the primary chamber; and
an inflator actuatable to provide inflation fluid to the primary chamber to inflate the primary chamber, wherein the active vent is actuatable to the closed condition to prevent fluid communication between the primary and secondary chambers in response to occupant penetration into the primary chamber and un-actuated to remain in the open condition to allow fluid communication between the primary and secondary chambers in response to occupant penetration into the secondary chamber, and wherein the second passive vent automatically closes to prevent fluid flow from the lower inflatable volume to the upper inflatable volume in response to occupant penetration into the secondary chamber.

* * * * *